H. PEARCE.
ELECTRICAL PROTECTIVE DEVICE.
APPLICATION FILED MAY 2, 1918.

1,349,385.

Patented Aug. 10, 1920.

WITNESSES:
Ed. V. Herron
J H Procter

INVENTOR
Herbert Pearce
BY
Wesley G. Carr
ATTORNEY

UNITED STATES PATENT OFFICE.

HERBERT PEARCE, OF MANCHESTER, ENGLAND, ASSIGNOR TO WESTINGHOUSE ELECTRIC & MANUFACTURING COMPANY, A CORPORATION OF PENNSYLVANIA.

ELECTRICAL PROTECTIVE DEVICE.

1,349,385.   Specification of Letters Patent.   Patented Aug. 10, 1920.

Application filed May 2, 1918. Serial No. 232,153.

*To all whom it may concern:*

Be it known that I, HERBERT PEARCE, a subject of the King of Great Britain, and a resident of Manchester, in the county of Lancaster, England, have invented a new and useful Improvement in Electrical Protective Devices, of which the following is a specification.

My invention relates to protective devices for alternating-electric-current circuits, and it has for its object to provide an improved apparatus for protecting conductors that are connected in parallel and adapted to transmit electric energy in either direction from one circuit to another.

In practising my invention, means are provided whereby, when a fault occurs on either of the parallel conductors, one of them is disconnected from the circuit and a protective device is automatically provided for the other conductor which will operate to disconnect the same from the circuit should a fault or an overload occur thereon.

It will be seen, therefore, that, by this system of protection, if one of the conductors is disconnected because of a fault occurring on that conductor, energy may still be transmitted through the remaining conductor which is, however, automatically protected against faults and overloads. If, however, both conductors are disconnected from the circuit, a fault must have occurred on the second conductor because this conductor can only be disconnected from the circuit after the first-mentioned conductor has been disconnected. If a relatively small fault occurs on the second-mentioned conductor, it may result in the first conductor only being disconnected from the circuit, because the small fault may not give rise to sufficient increase in the current through the second-mentioned conductor to operate the automatic protective gear by which it is to be protected after the first conductor has been disconnected. An examination of the measuring instruments, however, will, in general, be sufficient to determine which of the two cases mentioned has actually occurred.

Figure 1:
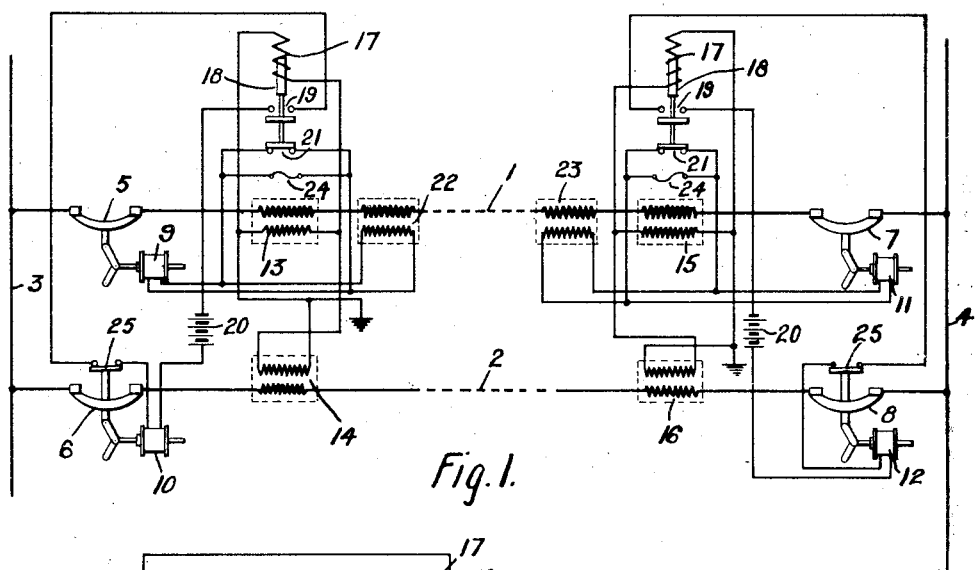
Figure 2:
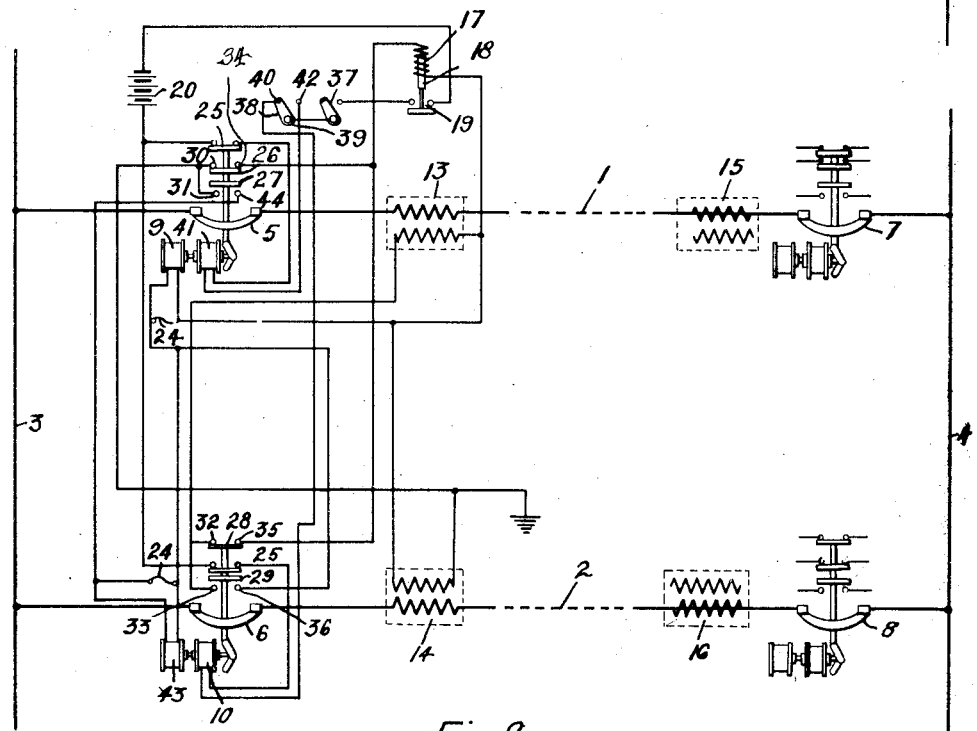

Figure 1 of the accompanying drawings is a diagrammatic view of an electrical circuit embodying my invention, and Fig. 2 is a diagrammatic view of an electrical circuit embodying a modified form of my invention.

In Fig. 1 of the drawings, two feeder conductors 1 and 2 are connected in parallel to convey energy between bus-bars 3, 4, of two substations forming part of a ring-connected system of distribution. Automatic circuit interrupters 5, 6, 7 and 8, preferably of the oil-insulated type, are provided with trip coils 9, 10, 11 and 12, respectively, and are disposed at the respective ends of the conductors 1 and 2. At each end of the feeders, at a place adjacent to the bus-bars 3, 4, series transformers 13, 14, 15 and 16 are provided, having their secondary windings cross-connected, as shown, and their neutral points joined to the operating coils 17 of relays 18 in a well-known manner. The trip coils 10 and 12 of the circuit interrupters 6 and 8 of the feeder conductor 2 are connected to the contact members 19 of the relays 18 in such a manner that, when the relay coils 17 are energized, the trip coils are connected in the circuit with their respective sources 20 of electromotive forces and the circuit breakers 6 and 8 are operated to disconnect the feeder conductor 2 from the circuit.

The trip coils 9 and 11 of the circuit interrupters 5 and 7 of the feeder conductor 1 are normally short-circuited through the contact members 21 of the relays 18, but when the relays are energized, the contact members are disengaged and the trip coils 9 thereby receive current from the secondary windings of series transformers 22 and 23, respectively, that are located near the ends of the said feeder conductor in order that the feeder conductor may thus be protected against overloads and faults. Preferably, the circuit interrupters 5 and 7 of the feeder conductor 1 are provided with time-lag devices, such, for instance, as time-limit fuses 24 that are connected in parallel relation to the trip coils 9 and 11. With this arrangement, an interval of time will occur between the occurrence of an overload or fault on the feeder conductor and the operation of its circuit interrupters.

If such a fault occurs on either feeder conductor that the current balance of either of the transformers 15 and 16, for example, is upset, the relay coil 17 will be energized and contact members 19 will close the circuit of the trip coil 12, and the circuit interrupter 9 will be caused to open the circuit of the feeder conductor 2. The balance of the transformers 13 and 14 may have been upset at the same time, in which case, the circuit interrupter 6 will be simultaneously caused to open by the energizing of the trip coil 10, and, in any case, the balance of said transformers 13 and 14, will be so completely upset by the opening of the circuit interrupter 8 that the circuit interrupter 6 will inevitably be opened. The energizing of the relays 18 will open the circuit through the contact members 21 and, consequently, the trip coils 9 and 11 will be energized from their respective transformers 22 and 23, by which means the feeder conductor 1 will be protected against overloads as soon as feeder conductor 2 is disconnected from the circuit, as above set forth. The trip coils 10 and 11 may be provided with auxiliary switches 25 that operate from the circuit interrupters 6 and 8 in the usual manner to prevent the current being broken at the contact members 19 when the relay is deënergized.

It will be observed that the operation of the arrangement is the same whether the fault be on feeder conductor 1 or on the feeder conductor 2. If the fault be on the feeder conductor 2, this feeder will be disconnected without interrupting the direct connection between the bus-bars 3 and 4 through the remaining feeder conductor 1, which is, however, automatically provided with overload protection. If the fault originally occurs on the feeder conductor 1, the feeder conductor 2 is first cut out of circuit and then the overload trip coils 9 and 11, corresponding to the feeder conductor 1, will operate to disconnect the feeder conductor 1 as well; the attendant, therefore, always knows that if, on the one hand, both circuit breakers at the substation are opened, the fault is on the feeder conductor 1, but if, on the other hand, only one circuit interrupter opens, the fault is either on the feeder conductor 2 or else it is a relatively small fault on the feeder conductor 1, and an examination of the ammeter readings (preferably on all phases) may determine which is the correct interpretation.

In Fig. 2 of the drawings, the same reference numerals denote the same parts as in Fig. 1 and it will be understood that the arrangement shown at the left-hand end of the diagram is duplicated at the right-hand end. The relay contact members 21 are replaced by the double-throw switches 26 and 27 and 28 and 29. One contact member 30 and 31 of each of the switches 26 and 27 is connected to one terminal of the secondary winding of transformer 14 and one contact member 32 and 33 of each of the switches 28 and 29 is connected to the relatively opposite terminal of the secondary winding of transformer 13. The contact members 34 and 35 of the switches 26 and 28 are connected together and to one terminal of the relay coil 17, the other terminal of said relay coil being connected to the cross connection between the secondary windings of transformers 13 and 14, as shown. The other contact member 36 of the switch 29 is connected to one terminal of the overload coil 9 of the circuit interrupter 5, the other terminal of said overload coil being connected to the cross connections between the secondaries of the two transformers 13 and 14. The source 20 of electromotive force is connected to the trip coil 10 of the circuit interrupter 6 through the relay contact members 19, switch 37 and a link or switch member 38 connecting the terminals 39 and 40.

The switches 26, 27, 28 and 29 are so arranged that, when the circuit interrupters 5 and 6 are closed, the bridging member of the switch 26 engages the contact members 30 and 34, and the bridging member of the switch 28 engages the stationary contact members 32 and 35, thus completing the cross connection of the secondary windings of the transformers 13 and 14.

If a fault occurs on either of feeder conductors 1 and 2, the current balance of the transformers 13 and 14 will be upset and the relay 18 will be so operated as to close the contact members 19, whereupon the trip coil 10 will be energized and the circuit interrupter 6 opened in a similar manner, as hereinbefore described with reference to Fig. 1. The opening of circuit interrupter 6 so actuates the switches 28 and 29 that the bridging members of the switch 28 become disengaged from the contact members 32 and 35 and the bridging member of the switch 29 engages the contact members 33 and 36, thereby connecting the overload trip coil 9 of circuit interrupter 5 across the terminal of the secondary winding of transformer 13 to protect the feeder conductor 1 against overloads. It will be observed that the transformer 13 takes the place of transformer 22 of Fig. 1, which is not required.

In Fig. 2, a trip coil 41 for the circuit interrupter 5, corresponding to the trip coil 10 of the circuit interrupter 6, is shown, one terminal of which is connected to the terminal of the source 20 of electromotive force through the switch 25, and the other terminal of which is connected to a contact member 42. The circuit interrupter 6 is also provided with an overload trip coil 43, corresponding to the overload trip coil 9 of the circuit interrupter 5, one end of said coil 43 being connected to one contact member 44 of the switch 27, the other terminal being connected to the cross connection between the secondary windings of the transformers 13 and 14, to which also one terminal of the overload trip coil 9 is connected.

If the link or switch member 38 is so changed that, instead of connecting contact members 39 and 40, it connects contact members 39 and 42, it will be observed that the operation of the relay 17 will cause the coil 41 to be energized from the source 20 of electromotive force instead of the coil 10, and, consequently, the circuit interrupter 5 will be operated to interrupt the feeder conductor 1 instead of the circuit interrupter 6, interrupting the feeder conductor 2. When a fault occurs on either feeder conductor, and when the feeder conductor 1 has been so disconnected, the overload trip coil 43 of the circuit interrupter 6 will be connected, through the switch 27, to the secondary winding of transformer 14, in order that the feeder conductor 2 may be protected against overloads. It is necessary, of course, that the apparatus at each end of the feeder conductors 1 and 2 be so connected in a corresponding manner that one of the feeder conductors may be entirely disconnected and the other feeder conductor remain with overload protection. The position of the link 38 of the apparatus will determine which feeder conductor is disconnected first.

When the link 38 is arranged to so connect the contact members 39 and 40 that the feeder conductor 2 is disconnected before the feeder conductor 1, the latter feeder conductor should always be connected into circuit before the former, that is to say, the feeder conductor which is disconnected first should always be connected into circuit last, and, when closing the circuit interrupter to connect the second feeder conductor into circuit, the switch 37 may momentarily be held open.

It will be readily understood by those skilled in the art, without detailed description, that, in the arrangement shown in Fig. 1, the circuit interrupters 5 and 7 may be provided with trip coils corresponding to the trip coils 10 and 12, of the circuit interrupters 6 and 8, and that the circuit interrupters 6 and 8 may be provided with trip coils corresponding to trip coils 9 and 11 and switching devices arranged somewhat similarly to the arrangements shown in Fig. 2, whereby the sequence of the operation of the circuit interrupters 5 and 6 and 7 and 8 may be so reversed that, when a fault occurs on either of the feeder conductors, the feeder conductor 1 may be disconnected before the feeder conductor 2 and the feeder conductor 2 left provided with overload protection.

To facilitate switching operations, a voltmeter may be provided to indicate, at one substation, when the feeder conductor is connected to the bus-bars at the other substation. This is not shown in the drawing, neither are the various measuring instrument which, if desired, may be operated from the transformers 13 and 14.

It will be seen that, by this invention, not only are the parallel-connected feeder conductors so protected, irrespective of the direction of the flow of energy through them, that feeder conductors employed in ring systems, for example, may be protected, but also an indication will be afforded as to which conductor is faulty, this information being naturally of importance both for the purpose of continuing the supply through the non-faulty feeder conductor and for the purpose of repairing the faulty feeder conductor.

The invention is, furthermore, not limited to the particular arrangements illustrated, as many modifications may be made without departing from the spirit and scope of the invention as set forth in the appended claims.

I claim as my invention:

1. In a system of distribution, the combination with two parallel-connected feeder conductors and circuit interrupters therefor, of means for tripping the circuit interrupters of one conductor when a fault occurs upon either conductor and means for rendering the circuit interrupter of the other conductor responsive to overload conditions only after the other conductor is disconnected.

2. In a system of distribution, the combination with parallel-connected feeder conductors, of means for disconnecting one feeder conductor from the system when a fault occurs on any of the conductors, and means for disconnecting the other conductors from the system only when an overload traverses the same after the other conductor is disconnected.

3. In a system of distribution, the combination with a plurality of parallel-connected feeder conductors, of means for disconnecting one of the conductors from the system when a fault occurs on any of the conductors, and means for protecting the other conductors against overloads only after the said conductor is disconnected from the circuit.

4. In a system of distribution, the combination with two parallel-connected feeder conductors, of means for disconnecting a predetermined feeder conductor from the system when a fault occurs on either one of the conductors and overload protective means for the other conductor that is effective only after the predetermined conductor is disconnected from the system.

5. The combination with two parallel-connected feeder conductors, of means for disconnecting one of the conductors when a fault occurs upon either of the conductors, and protective means for the other conductor that is rendered effective only after one conductor has been disconnected.

6. The combination with two parallel-connected feeder conductors, of means for disconnecting one of the conductors when a fault occurs upon either of the conductors, and overload protective means for the other conductor that is rendered effective only after one conductor has been disconnected.

7. In a system of distribution, the combination with two parallel-connected feeder conductors and a circuit interrupter for each end of each conductor, of means for tripping the interrupters of one conductor when different values of current traverse the conductors, tripping devices for the other interrupters, and means for rendering the overload tripping devices effective only after the other conductor is disconnected from the circuit.

8. In a system of distribution, the combination with two parallel-connected feeder conductors and a circuit interrupter for each end of each conductor, of means for tripping the interrupters of one conductor when different values of current traverse the conductors, overload tripping devices for the other interrupters, and means for rendering the overload tripping devices effective only after the other conductor is disconnected from the circuit.

9. In a system of distribution, the combination with two parallel-connected feeder conductors and a circuit interrupter for each end of each conductor, of means for tripping the interrupters of one conductor when a fault occurs on the system, overload trip coils for the other interrupters, and means for so controlling the overload trip coils that they are only effective when one conductor is disconnected from the system.

10. In a system of distribution, the combination with two parallel-connected feeder conductors and a circuit interrupter for each end of each conductor, of means for tripping the interrupters of one conductor when a fault occurs on the system, overload trip coils for the other interrupters, and means for rendering the overload trip coils effective only after the other feeder conductor is disconnected from the system.

In testimony whereof, I have hereunto subscribed my name this 28th day of March 1918.

HERBERT PEARCE.

It is hereby certified that in Letters Patent No. 1,349,385, granted August 10, 1920, upon the application of Herbert Pearce, of Manchester, England, for an improvement in "Electrical Protective Devices," errors appear in the printed specification requiring correction as follows: Page 1, line 107, for the reference-numeral "9" read *8;* page 4, line 34, claim 9, for the words "only effective" read *effective only;* and that the said Letters Patent should be read with these corrections therein that the same may conform to the record of the case in the Patent Office.

Signed and sealed this 21st day of September, A. D., 1920.

[SEAL.]                               M. H. COULSTON,
*Acting Commissioner of Patents.*

Cl. 175–294.